(12) United States Patent
Nakagome et al.

(10) Patent No.: US 10,713,477 B2
(45) Date of Patent: Jul. 14, 2020

(54) EXPRESSION DETERMINATION DEVICE, EXPRESSION DETERMINATION METHOD, AND RECORDING MEDIUM

(71) Applicant: CASIO COMPUTER CO., LTD., Shibuya-ku, Tokyo (JP)

(72) Inventors: Kouichi Nakagome, Tokorozawa (JP); Keisuke Shimada, Hamura (JP)

(73) Assignee: CASIO COMPUTER CO., LTD., Tokyo (JP)

(*) Notice: Subject to any disclaimer, the term of this patent is extended or adjusted under 35 U.S.C. 154(b) by 88 days.

(21) Appl. No.: 15/989,688

(22) Filed: May 25, 2018

(65) Prior Publication Data

US 2018/0365483 A1 Dec. 20, 2018

(30) Foreign Application Priority Data

Jun. 19, 2017 (JP) .................................. 2017-119550

(51) Int. Cl.
*G06K 9/00* (2006.01)

(52) U.S. Cl.
CPC ..... *G06K 9/00302* (2013.01); *G06K 9/00248* (2013.01)

(58) Field of Classification Search
None
See application file for complete search history.

(56) References Cited

U.S. PATENT DOCUMENTS

| 8,165,399 | B2 | 4/2012 | Kaneda et al. |
| 8,233,678 | B2 | 7/2012 | Ogawa |
| 8,254,691 | B2 | 8/2012 | Kaneda et al. |
| 8,494,233 | B2 | 7/2013 | Kaneda et al. |
| 2010/0189358 | A1* | 7/2010 | Kaneda ............... G06K 9/00744 382/195 |
| 2012/0044384 | A1* | 2/2012 | Shibagami ........... H04N 1/2112 348/231.99 |
| 2012/0169887 | A1* | 7/2012 | Zhu ..................... G06K 9/00335 348/207.1 |
| 2015/0324632 | A1* | 11/2015 | Whitehill ........... G06K 9/00281 382/159 |
| 2017/0337602 | A1* | 11/2017 | Davis ................. G06Q 30/0607 |

FOREIGN PATENT DOCUMENTS

| JP | 2005056388 A | 3/2005 |
| JP | 2008186303 A | 8/2008 |
| JP | 2008310775 A | 12/2008 |
| JP | 2009043065 A | 2/2009 |
| JP | 2009049489 A | 3/2009 |
| JP | 2014229012 A | 12/2014 |

OTHER PUBLICATIONS

Japanese Office Action dated Sep. 24, 2019 (and English translation thereof) issued in Japanese Application No. 2017-119550.

* cited by examiner

*Primary Examiner* — David Perlman
(74) *Attorney, Agent, or Firm* — Holtz, Holtz & Volek PC

(57) ABSTRACT

A determination result is easily obtained even in expression determination on a face image that is not a front view. A Robot includes a camera, a face detector, a face angle estimator, and an expression determiner. The camera acquires image data. The face detector detects a face of a person from the image data acquired by the camera. The face angle estimator estimates an angle of the face detected by the face detector. The expression determiner determines an expression of the face based on the angle estimated by the face angle estimator.

16 Claims, 11 Drawing Sheets

EXPRESSION DETERMINATION DEVICE, EXPRESSION DETERMINATION METHOD, AND RECORDING MEDIUM

CROSS-REFERENCE TO RELATED APPLICATION

This application claims the benefit of Japanese Patent Application No. 2017-119550, filed on Jun. 19, 2017, the entire disclosure of which is incorporated by reference herein.

FIELD

This application relates generally to an expression determination device, an expression determination method, and a recording medium.

BACKGROUND

As in Unexamined Japanese Patent Application Kokai Publication No. 2009-49489, imaging devices that automatically capture an image when a subject wears a facial expression of smile are described. However, the imaging device that is described in Patent Literature 1 uses, as the expression determination target, a face image when the face of the subject is of a front view. On the other hand, as for face authentication-related techniques, Patent Literature 2 describes a face authentication device that is capable of face authentication regardless of the orientation of the face by normalization to a front view face using a three-dimensional face model.

SUMMARY

According to one aspect of the present disclosure, an expression determination device includes a processor. The processor is configured to acquire image data, detect a face of a person from the acquired image data, estimate an angle of the detected face, and determine an expression of the face based on the estimated angle of the face.

According to another aspect of the present disclosure, an expression determination method includes an image acquisition step of acquiring image data, a face detection step of detecting a face of a person from the image data acquired in the image acquisition step, a face angle estimation step of estimating an angle of the face detected in the face detection step; and an expression determination step of determining an expression of the face based on the angle of the face estimated in the face angle estimation step.

According to yet another aspect of the present disclosure, a non-transitory computer-readable recording medium stores a program. The program causes a computer to acquire image data, detect a face of a person from the image data acquired by the image acquisition function, estimate an angle of the face detected by the face detection function; and determine an expression of the face based on the angle of the face estimated by the face angle estimation function.

BRIEF DESCRIPTION OF THE DRAWINGS

A more complete understanding of this application can be obtained when the following detailed description is considered in conjunction with the following drawings, in which.

DETAILED DESCRIPTION

The expression determination device, the expression determination method, and the program according to embodiments of the present disclosure will be described below with reference to the drawings. In the figures, the same or corresponding parts are referred to by the same reference numbers.

Embodiment 1

Figure 1:
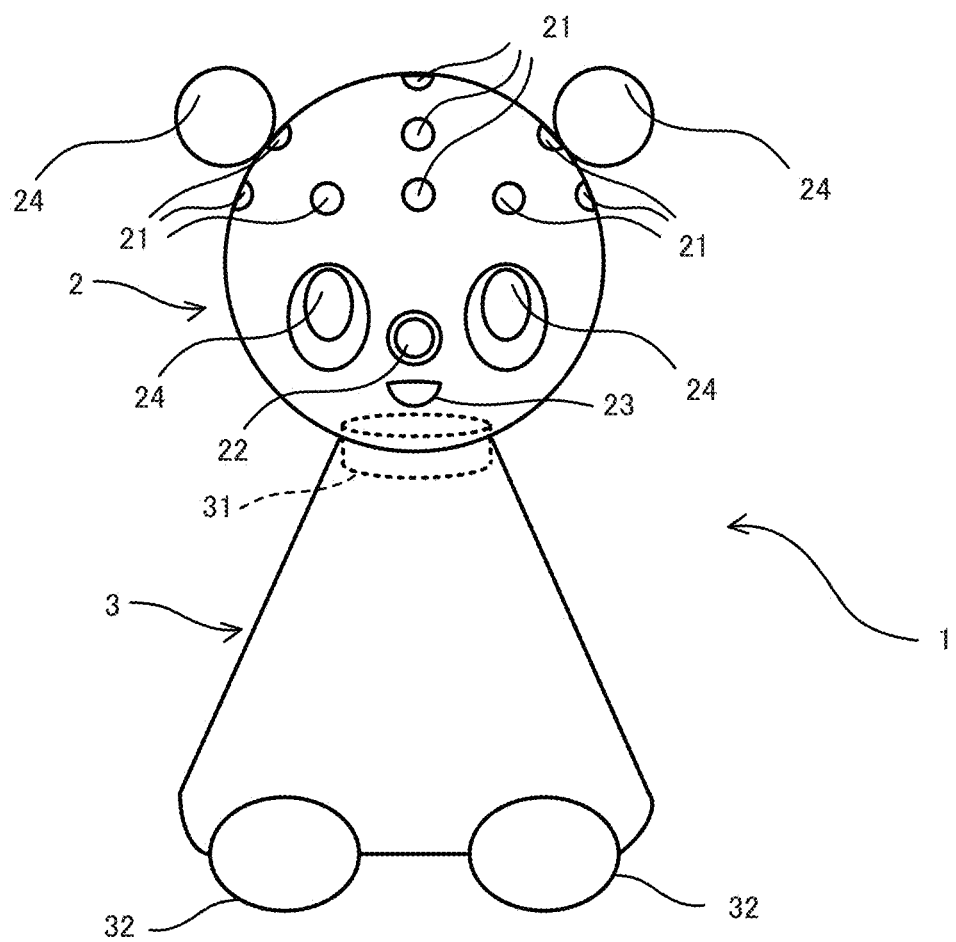
FIG. 1 is an external view of a robot according to Embodiment 1 of the present disclosure.

The expression determination device according to Embodiment 1 of the present disclosure is a robot 1 that determines from a face image of a person whether the person wears a facial expression of smile. The robot 1 is, as shown in FIG. 1, a humanoid communication robot that includes a head 2 and a body 3. The robot 1 can, for example, move around in a house and have conversations with the residents. Moreover, the robot 1 can, for example, move around in an event venue and guide event-visitors or answer inquiries from event-visitors.

As shown in FIG. 1, microphones 21, a camera 22, a speaker 23, and sensors 24 are provided on the head 2 of the robot 1.

Multiple microphones 21 are provided in the upper part of the head 2 and constitute an array of microphones. The microphones 21 function as a voice acquirer that acquires data of voice around the robot 1.

The camera 22 is an imager that is provided at a position in the center of the front of the head 2 that corresponds to the nose in a human face. The camera 22 acquires data of an image in front of the robot 1 with respect to the optical axis direction of the imager, and enters the acquired image data in a processor 100 that is described later. As a result, the processor 100 functions as an image acquirer that acquires image data. The camera 22 can acquire image data as many as the number of frames per second. For example, when the frame rate is 30, the camera 22 can acquire each image data (a frame) in every 1/30 second. Each image data acquired in every (1/the frame rate) second is also referred to as a frame image.

The speaker 23 is provided at a position under the camera 22 that corresponds to the mouth in a human face. The speaker 23 functions as a voice outputter that outputs voice.

The sensors 24 are provided at positions that correspond to the eyes and the ears in a human face. The sensors 24 include an acceleration sensor, an obstacle detection sensor, and the like, detect various kinds of physical quantities, and are used for controlling the orientation and assuring the safety of the robot 1.

Figure 2:
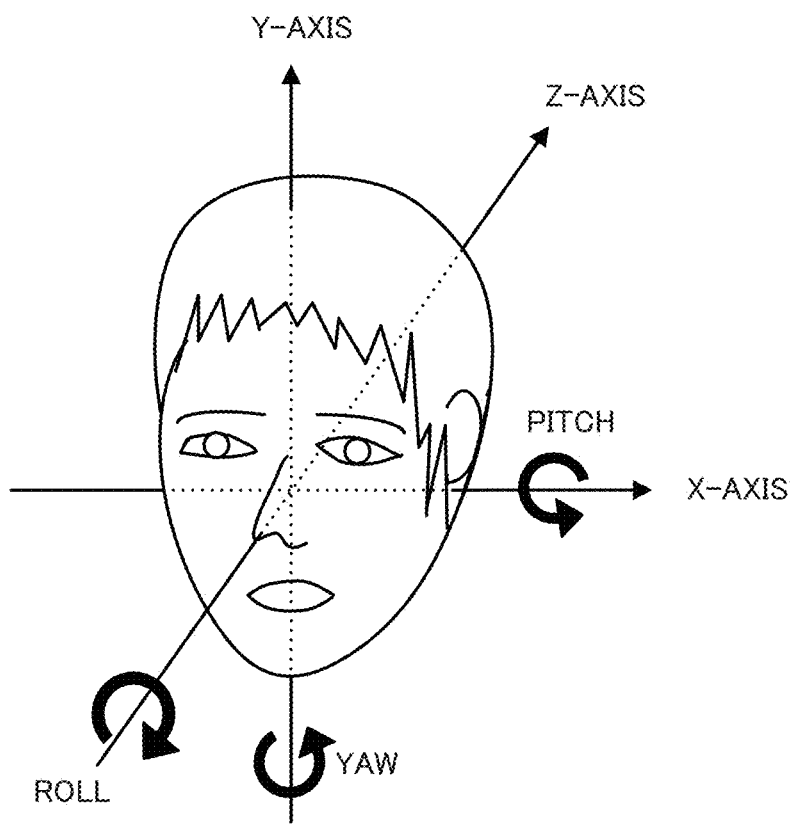
FIG. 2 is an illustration for explaining the rotation directions of a head.

As shown in FIG. 1, the head 2 and the body 3 of the robot 1 are connected to each other by a neck joint 31 that is marked by dashed lines. The neck joint 31 includes multiple motors. The processor 100 that is described later drives the multiple motors to rotate the head 2 of the robot 1. The head 2 can rotate, as shown in FIG. 2, by a pitch angle about the X-axis, by a yaw angle about the Y-axis, and by a roll angle about the Z-axis.

As shown in FIG. 1, base carriers 32 are provided at the bottom part of the body 3 of the robot 1. The base carriers 32 include four wheels and drive motors. Of the four wheels, two are provided to the front of the body 3 as front wheels and the remaining two are provided to the back of the body 3 as rear wheels. As the wheels, for example, omni wheels, mecanum wheels, or the like may be used. As the processor 100 that is described later controls the drive motors to rotate the wheels, the robot 1 moves around.

Figure 3:
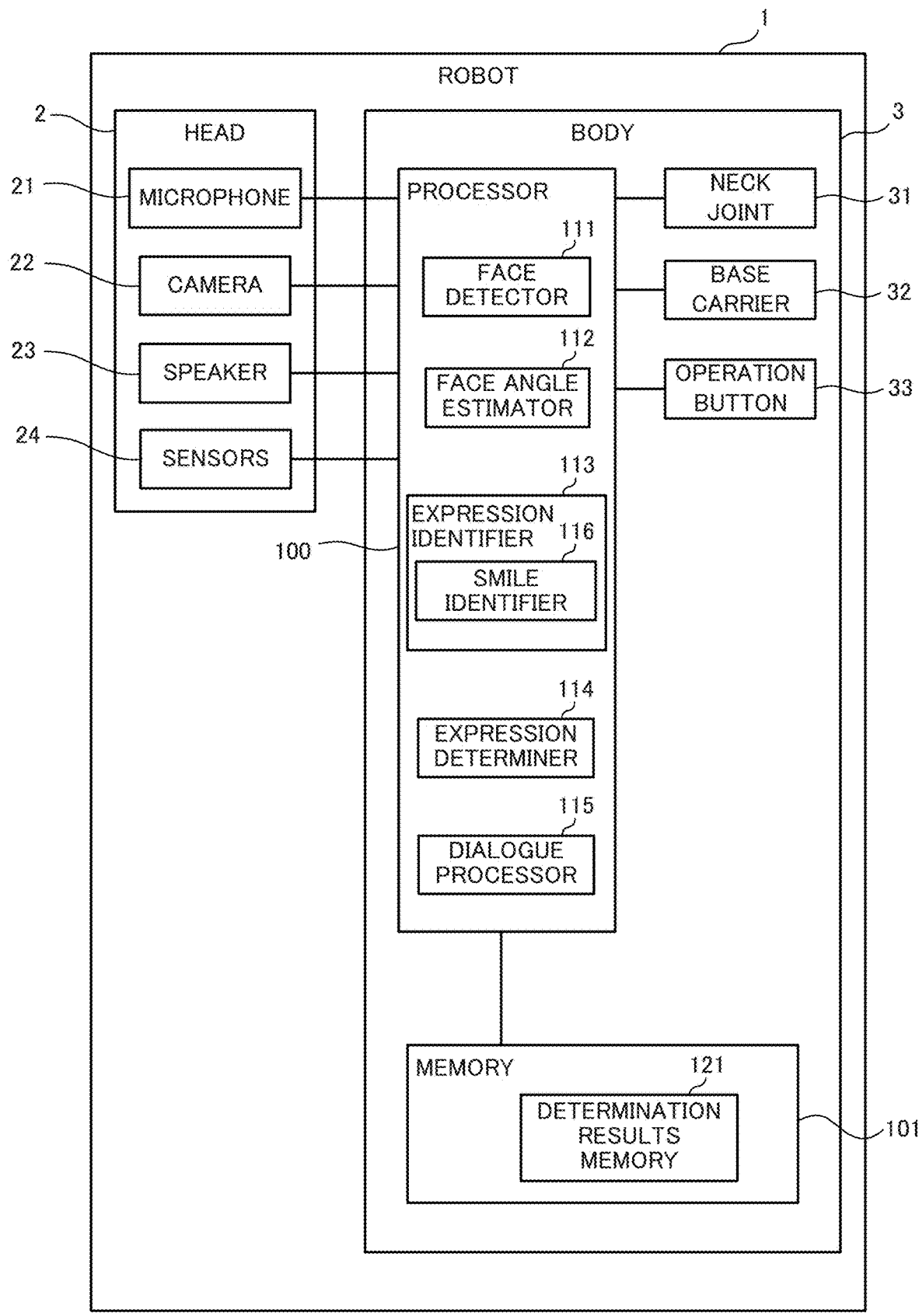
FIG. 3 is a diagram that shows the functional configuration of the robot as an expression determination device according to Embodiment 1.

The functional configuration of the robot 1 will be described next with reference to FIG. 3. As shown in FIG. 3, the robot 1 includes, in addition to the above configuration, an operation button 33, a processor 100, and a memory 101.

The operation button 33 is provided at a position on the back of the body 3. The operation button 33 is various kinds of buttons for operating the robot 1. The operation button 33 includes a power button, a volume adjustment button for the speaker 23, and the like.

The processor 100 includes a central processing unit (CPU) and the like. Executing programs that are stored in the memory 101, the processor 100 functions as the image acquirer, which is mentioned above, and a face detector 111, a face angle estimator 112, an expression identifier 113, an expression determiner 114, and a dialogue processor 115, which are described later.

The memory 101 includes a read only memory (ROM), a random access memory (RAM), and the like and stores programs that are executed by the CPU of the processor 100, various kinds of data, and the like. Moreover, the memory 101 functionally includes a determination results memory 121. The determination results memory 121 stores a result of determination of the expression determiner 114 (an expression determination value that is described later) along with a determination time.

The functions that are realized by the processor 100 will be described next. As stated above, executing programs that are stored in the memory 101, the processor 100 functions as the face detector 111, the face angle estimator 112, the expression identifier 113, the expression determiner 114, and the dialogue processor 115.

The face detector 111 detects a human face in a frame image that is entered by the camera 22 and acquires and normalizes a region in which the human face is present in the frame image. The method of detecting a human face is a known technique and its detail is omitted. However, for example, it is suggested to presave data of a human face template in the memory 101 and detect a part of which the similarity to the template is equal to or higher than a reference value in a frame image as a face image. Then, the face detector 111 can normalize image data of the face image (face image data) based on the size, the position, the roll angle (the tilting angle of the face), and the like of the detected face. This normalization does not require a three-dimensional model and thus can be performed at a high speed in relatively light processing.

Figure 4:
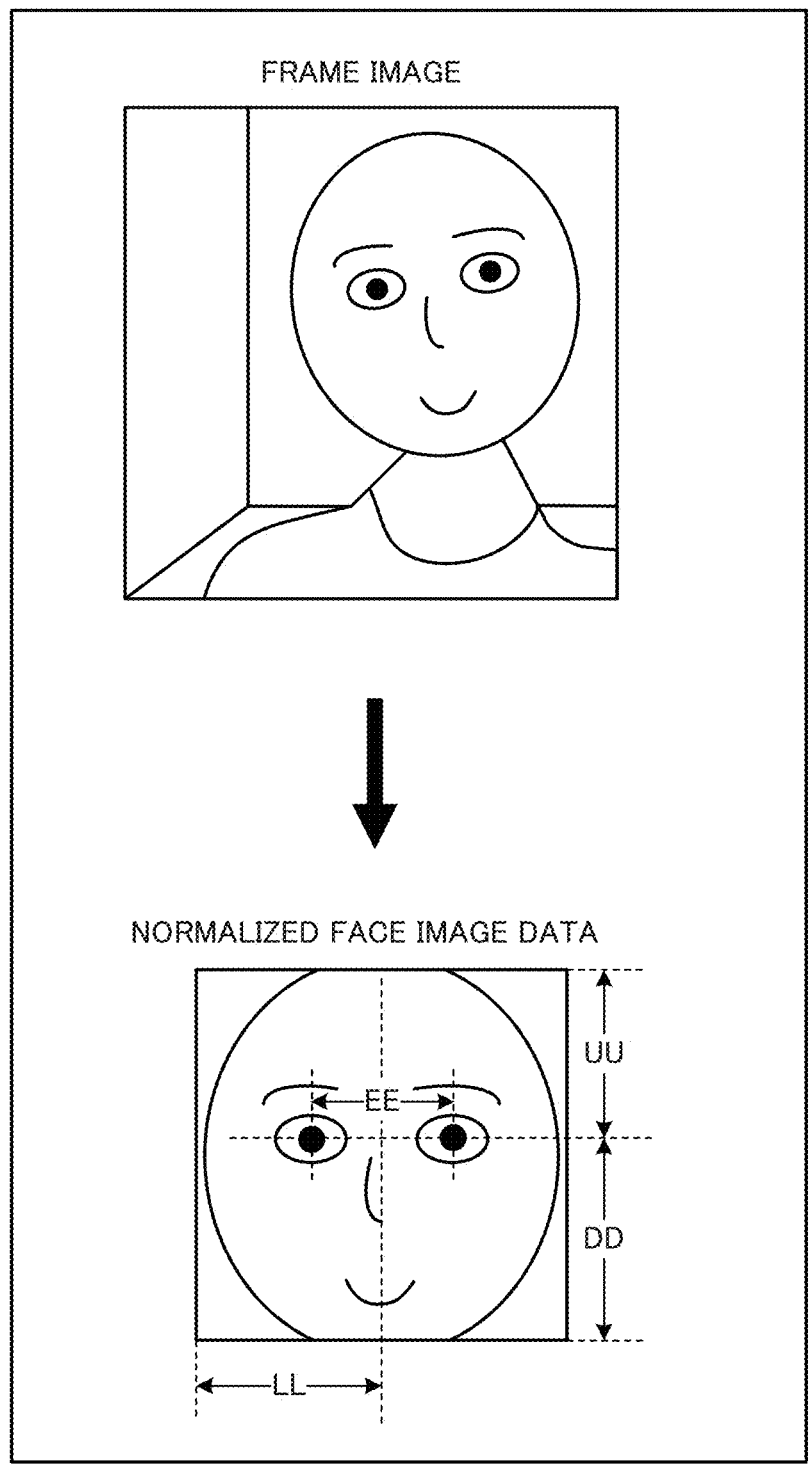
FIG. 4 is an illustration for explaining the normalization of face image data.

For example, as shown in FIG. 4, from a frame image in which a face is detected, it is possible to adjust the roll angle so that the eyes are horizontal, normalize the face size based on the distance between the centers of the right and left eyes, and normalize the face position based on the height and the horizontal positions of the eyes. In FIG. 4, EE is the distance between the centers of the right and left eyes, LL is the distance from the left edge of the image to the midpoint between the right and left eyes, UU is the distance from the upper edge of the image to the center of the eyes, and DD is the distance from the center of the eyes to the lower edge of the image. Properly setting these values, the face detector 111 can generate normalized face image data for an image size (horizontal, vertical) of (LL×2, UU+DD).

Specifically, for example, when EE is set to 80 dots; LL, 100 dots; UU, 70 dots, and DD, 130 dots, normalized face image data for an image size of (200 dots, 200 dots) are obtained. In this exemplary setting, DD is set to a higher value compared with UU, whereby normalized face image data including a region around the eyes and a region around the mouth are obtained.

The face angle estimator 112 estimates the pitch angle of the face (an upward or downward face angle from the front view with respect to the optical axis direction of the camera 22, which is a degree of 0 when the face is a front view with respect to the optical axis direction of the camera 22, a negative angle when the face is an upturned face, and a positive angle when the face is an downturned face) based on the face image data that are detected and normalized by the face detector 111. For estimating the face pitch angle, the memory 101 prestores a three-dimensional shape model (a face model) of a standard front view face. The face angle estimator 112 detects face parts (eyes, a nose, a mouth, and the like) using conditional local neural fields (CLNF), a constrained local model (CLM), or the like. Then, the face angle estimator 112 applies the detected face parts to the face model using the three-dimensional shapes of the face parts and the two-dimensional coordinates on the image. Then, by solving a perspective n-point (PnP) problem, the face angle estimator 112 can calculate (estimate) the face angle from the two-dimensional coordinates and the three-dimensional coordinates. Here, the above method of estimating the face angle is given by way of example and the face angle estimator 112 may estimate the face angle by other methods.

Figure 5:
FIG. 5 is a chart that shows exemplary face image data when the face is turned.
Figure 6:
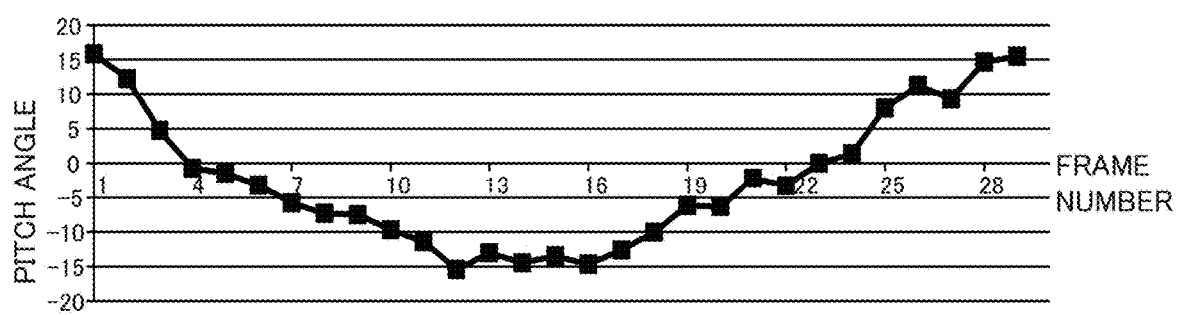
FIG. 6 is a line graph that shows an example of the pitch angle of the face that is estimated by the face angle estimator.

As an example, FIG. 5 shows extracted face image data when a subject turns his face from the downturned to the upturned and then to the downturned again while keeping his facial expression of smile. In FIG. 5, the numbers below the face image data are the frame numbers when the face image data are acquired. Here, the frame number is the numeric value of the counter that is incremented by one each time the camera 22 acquires image data (a frame). Furthermore, FIG. 6 shows a line graph that shows an example of the face pitch angle that is estimated by the face angle estimator 112 for each frame of face image data while the subject made the motion shown in FIG. 5.

The expression identifier 113 includes expression identifiers that acquire, for each kind of expression, a likelihood of the expression (a score of the expression). In Embodiment 1, the expression identifier 113 includes a smile identifier 116 as the expression identifiers. As feature quantities of the face image data that are detected and normalized by the face detector 111 are entered, the smile identifier 116 acquires a smile score that is a numeric value that indicates what degree of smile the facial expression wears (which presents the likelihood of smile and is a higher value as the degree of smile is higher). The smile score is one of expression scores. The degree of an expression the facial expression wears can be identified in accordance with the magnitude of the expression score, whereby "acquiring an expression score" is also referred to as "identifying an expression." Then, the expression score is also referred to as an expression identification result. As described above, in Embodiment 1, the expression identifier 113 includes the smile identifier 116 and the smile identifier 116 is an identifier that identifies smiles among facial expressions.

Specifically, the smile identifier 116 is an identifier that is generated through machine learning by a support vector machine (SVM) with input of feature quantities of face image data, among which face image data of a front view smiling face are a positive example and face image data of a front view face that is not smiling are a negative example. As the feature quantities of face image data that are entered in the smile identifier 116, a local binary patterns (LBP) histogram of face image data that are detected and normalized by the face detector 111 is used. Here, as the smile identifier 116, for example, an identifier other than the SVM, such as a neutral network, may be used. Moreover, as the feature quantities of face image data that are entered in the smile identifier 116, feature quantities other than the LBP histogram may be used.

Figure 7:
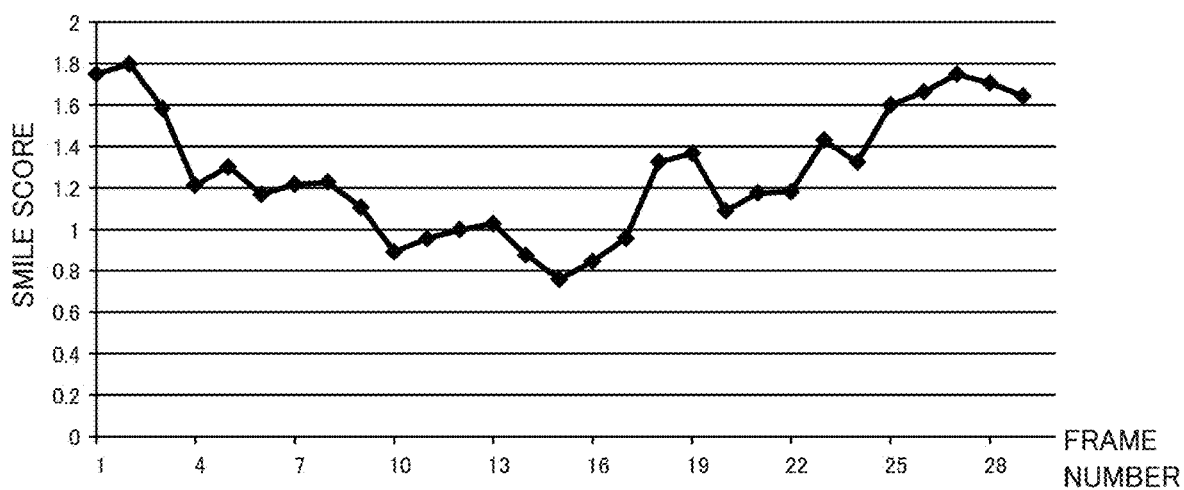
FIG. 7 is a line graph that shows an example of the smile score that is output by the smile identifier.

As an example, FIG. 7 shows a line graph that shows an example of the smile score that is acquired by the smile identifier 116 for each frame when feature quantities of face image data while the subject made the motion shown in FIG. 5 are entered in the smile identifier 116. It is confirmed from FIG. 7 that the value that is acquired by the smile identifier 116 (the value of the smile score) decreases as the face turns up although the subject did not change his expression and kept smiling. In other words, as the subject looks up, the rate of identifying an expression of smile deteriorates. Presumably, identifying the upturned corners of a mouth is important for identifying a smile. However, change in the upward angle of the corners of a mouth in accordance with the angle of photographing a face presumably affects the value that is acquired by the smile identifier 116.

Moreover, it is highly possible that because of machine learning with face image data of a front view, the smile identifier 116 fails to identify a smile normally (significantly worsens the identification rate) when the orientation of the face of entered face image data is significantly different from the front view. Here, the limit angle for the smile identifier 116 (and other expression identifiers that are described later) to identify an expression normally is termed an expression identifiable angle (for example, 30 degrees). It is desirable that the smile identifier 116 (and other expression identifiers that are described later) is used where the orientation of the face in an entered face image is within the expression identifiable angle from the front view.

The expression determiner 114 calculates a corrected expression score that is a value obtained by correcting the value of the expression score (the expression likelihood) that is acquired by the expression identifier 113 based on the angle that is estimated by the face angle estimator 112. In Embodiment 1, the expression determiner 114 calculates a corrected smile score that is a value obtained by correcting the value of the smile score that is acquired by the smile identifier 116 that is provided to the expression identifier 113 based on the angle that is estimated by the face angle estimator 112. Then, the value of the corrected smile score (the corrected expression score) that is calculated by the expression determiner 114 is the expression determination value. What extent of smile the expression of the face wears can be determined in accordance with the magnitude of the expression determination value, whereby "calculating an expression determination value" is also referred to as "determining the expression." Furthermore, an expression determination value is also referred to as an expression determination result. Specifically, the expression determiner 114 calculates a corrected smile score, namely an expression determination value (GE), by adding a pitch angle multiplied by a correction coefficient to a smile score (S) that is acquired by the smile identifier 116 based on the expression (1) below. Here, in Embodiment 1, −0.025 is used as the correction coefficient (coef).

$$GE = S + coef \times Pitch \tag{1}$$

where GE is the expression determination value (the corrected smile score), S is the acquired value of the smile identifier (the smile score), coef is the correction coefficient, and Pitch is the estimated value of the face angle estimator (the pitch angle).

Figure 8:
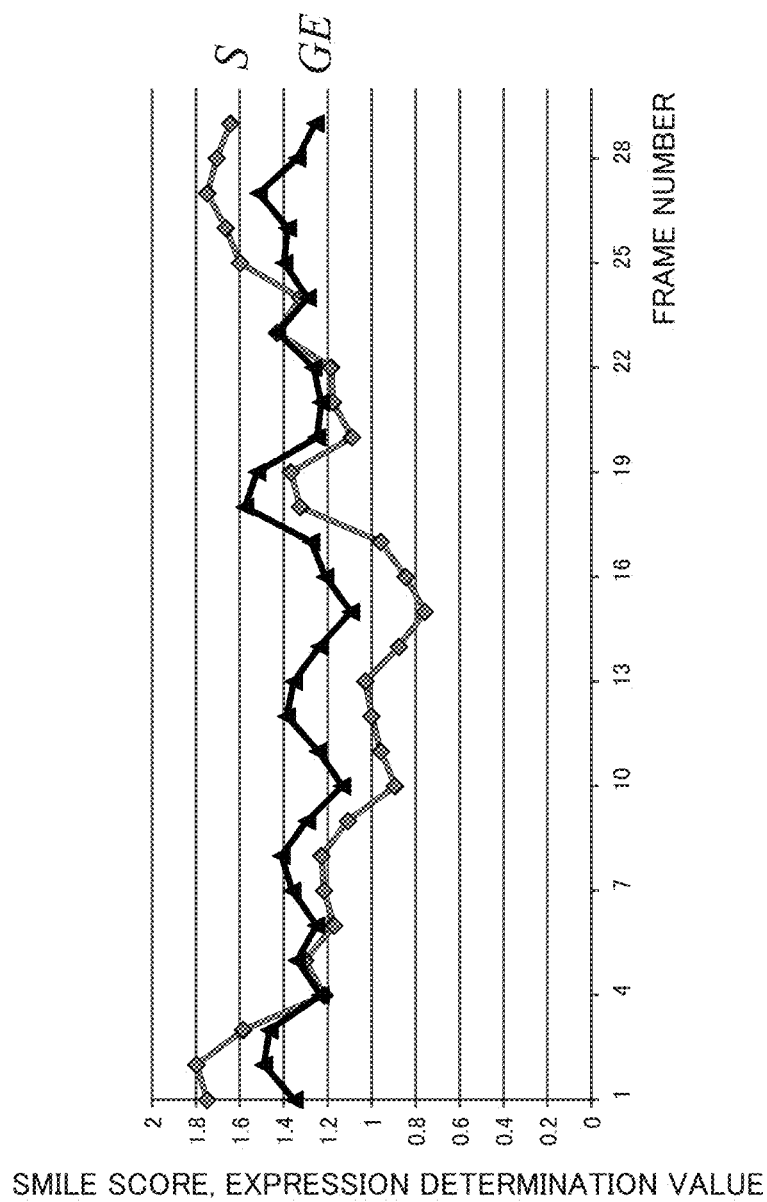
FIG. 8 is a line graph that shows an example of the smile score that is output by the smile identifier and an example of the expression determination value that is corrected by the expression determiner.

As an example, FIG. 8 shows a line graph that shows an example of the smile score that is acquired by the smile identifier 116 when face image data while the subject made the motion shown in FIG. 5 are entered and an example of the expression determination value that is calculated by the expression determiner 114 based on the above expression (1). It is conformed from FIG. 8 that the value of the smile score that is acquired by the smile identifier 116 is largely affected by the orientation of the face of the subject while the value of the expression determination value that is calculated by the expression determiner 114 is not so much affected by the orientation of the face of the subject and is relatively stabilized.

The dialogue processor 115 performs dialogue with the user based on the expression (the expression determination value) that is determined by the expression determiner 114. For example, the dialogue processor 115 continues the conversation on a topic that is used in the current dialogue when the value of the expression determination value that is acquired by the expression determiner 114 is equal to or higher than a reference smile value (for example, 1), and tries to change the topic when the value of the expression determination value is lower than the reference smile value.

The functional configuration of the robot 1 is described above. The expression determination procedure of the robot 1 will be described next with reference to FIG. 9. As the robot 1 is activated, this procedure starts in parallel to other procedures (a dialogue procedure, a voluntary move-over procedure, and the like). First, the face detector 111 of the robot 1 acquires image data from the camera 22 (Step S101). The Step S101 is also called an image acquisition step. Next, the face detector 111 performs a procedure to detect a face from the acquired image data (Step S102). The Step S102 is also called a face detection step. Then, the processor 100 determines whether a face is detected by the face detector 111 (Step S103). If no face is detected (Step S103; No), the processing returns to the Step S101.

If a face is detected (Step S103; Yes), the face detector 111 acquires face image data from the camera 22 during image-acquisition reference time (for example, 0.5 second) (Step S104). The image-acquisition reference time is a time equal to or longer than the longer one of the time to acquire face images data of frames as many as necessary for the face angle estimator 112 to estimate the face angle and the time to acquire face images data of frames as many as necessary for the expression identifier 113 to identify the expression (to acquire an expression score). If this time is set to a high value, there is a trade-off between an improved accuracy of estimating the face angle and identifying the expression and a reduced speed of determining the expression. Using face image data of multiple frames that are acquired here in identifying the expression and estimating the face angle, the robot 1 can highly reliably identify the expression and estimate the face angle compared with the case of using face image data of a single frame.

Here, in the Step S104, the face detector 111 may acquire from the camera 22 face image data of an image-acquisition reference number of frames (for example, 10 frames) instead of the image-acquisition reference time. The image-acquisition reference number of frames is a number of frames equal to or greater than the greater one of the number of frames of face image data necessary for the face angle estimator 112 to estimate the face angle and the number of frames of face image data necessary for the expression identifier 113 to identify the expression (to acquire an expression score). Like the image-acquisition reference time, if the image-acquisition reference number of frames is set to a high value, there is a trade-off between an improved accuracy of estimating the face angle and identifying the expression and a reduced speed of determining the expression. Using face image data of the image-acquisition reference number of frames that are acquired here in identifying the expression and estimating the face angle, the robot 1 can highly reliably identify the expression and estimate the face angle compared with the case of using face image data of a single frame.

Next, the face angle estimator 112 estimates the pitch angle of the face from the multiple face image data that are acquired by the face detector 111 (Step S105). The Step S105 is also called a face angle estimation step.

Then, the processor 100 determines whether the absolute value of the pitch angle of the face that is estimated by the face angle estimator 112 exceeds an expression identifiable angle (for example, 30 degrees) (Step S106). If equal to or less than the expression identifiable angle (Step S106; No), the expression identifier 113 acquires an expression score (a smile score) (identifies the expression) of the face that is detected by the face detector 111 (Step S107). The Step S107 is also called an expression identification step. Then, the expression determiner 114 calculates an expression determination value (determines the expression) by applying the pitch angle that is estimated by the face angle estimator 112 and the expression score (the smile score) that is acquired by the expression identifier 113 to the above expression (1) (Step S108). The Step S108 is also called an expression determination step.

Then, the expression determiner 114 stores the calculated expression determination value and the current time in the determination results memory 121 (Step S109). Then, the expression determiner 114 outputs the expression determination value (the expression determination result) to the dialogue processor 115 (Step S110) and returns to the Step S101.

On the other hand, if the absolute value of the pitch angle of the face exceeds the expression identifiable angle in the Step S106 (Step S106; Yes), for such a face, the expression identifier 113 is likely to fail to correctly identify the expression. Then, the processor 100 determines whether a result that is determined by the expression determiner 114 within past effective time (for example, 10 seconds) is stored in the determination results memory 121 (Step S111). If not stored (Step S111; No), the processor 100 returns to the Step S101, determining no current facial expression (calculating no expression determination value) and outputting nothing to the dialogue processor 115.

If a result that is determined by the expression determiner 114 within past effective time is stored in the determination results memory 121 (Step S111; Yes), the processor 100 outputs the determination result (the expression determination value) that is stored in the determination results memory 121 to the dialogue processor 115 (Step S112) and returns to the Step S101.

With the above expression determination procedure, the robot 1 can determine the facial expression without much influence of the orientation of the face even if the person is looking down or up. Moreover, when the face is turned up or down more than the expression identifiable angle, the processor 100 decides that the normal expression determination cannot be performed, and outputs the expression that is determined within past effective time to the dialogue processor 115. As a result, even when the current facial expression cannot be determined, the dialogue processor 115 can obtain a past determination result (an expression determination value) that is highly possibly the current expression.

Variation 1

In Embodiment 1, the expression determiner 114 calculates an expression determination value based on the expression (1) when the absolute value of the pitch angle that is estimated by the face angle estimator 112 is equal to or less than the expression identifiable angle. However, this is not restrictive. For example, the expression determiner 114 may calculate an expression determination value based on the expression (1) only when the pitch angle that is estimated by the face angle estimator 112 is smaller than a reference upward angle (for example, −3 degrees) and use the smile score that is acquired by the expression identifier 113 as it is as the expression determination value when the pitch angle is equal to or larger than the reference upward angle (when the face is a front view or a downturned face with respect to the optical axis direction). Here, the reference upward angle is an angle that serves as a reference for determining whether the face is an upturned face and when the pitch angle (negative in the upward direction) is smaller than the reference upward angle, the face is determined to be an upturned face.

Moreover, for example, the expression determiner 114 may calculate an expression determination value based on the expression (1) only when the absolute value of the pitch angle that is estimated by the face angle estimator 112 is equal to or greater than a minimum correction angle (for example, 5 degrees) and use the expression score (the smile score) that is acquired by the expression identifier 113 as it is as the expression determination value when the absolute value of the pitch angle that is estimated by the face angle estimator 112 is less than the minimum correction angle. Here, the minimum correction angle is an angle that serves as a reference for determining whether the expression determiner 114 has to correct the acquired value of the expression identifier 113 and when the absolute value of the pitch angle is less than the minimum correction angle, it is determined that correction of the acquired value of the expression identifier 113 is unnecessary.

Performing the processing as described above makes it unnecessary in some cases to calculate the expression determination value based on the expression (1), whereby it is possible to reduce the amount of calculation processing of the expression determiner 114.

Variation 2

In Embodiment 1, after a face image is acquired in the Step S104, the face angle estimator 112 estimates the pitch angle of the face and when the absolute value of the pitch angle is equal to or less than the acceptable angle, the expression identifier 113 identifies the expression and acquires an expression score (a smile score). However, it is anticipated in the first place that the expression identifier 113 fails to identify the expression normally and the value of the expression score (the smile score) that is acquired by the expression identifier 113 is significantly low when the pitch angle of the face exceeds the acceptable angle. Then, Variation 2 in which the expression identifier 113 identifies the expression before the face angle estimator 112 estimates the pitch angle will be described.

Figure 9:
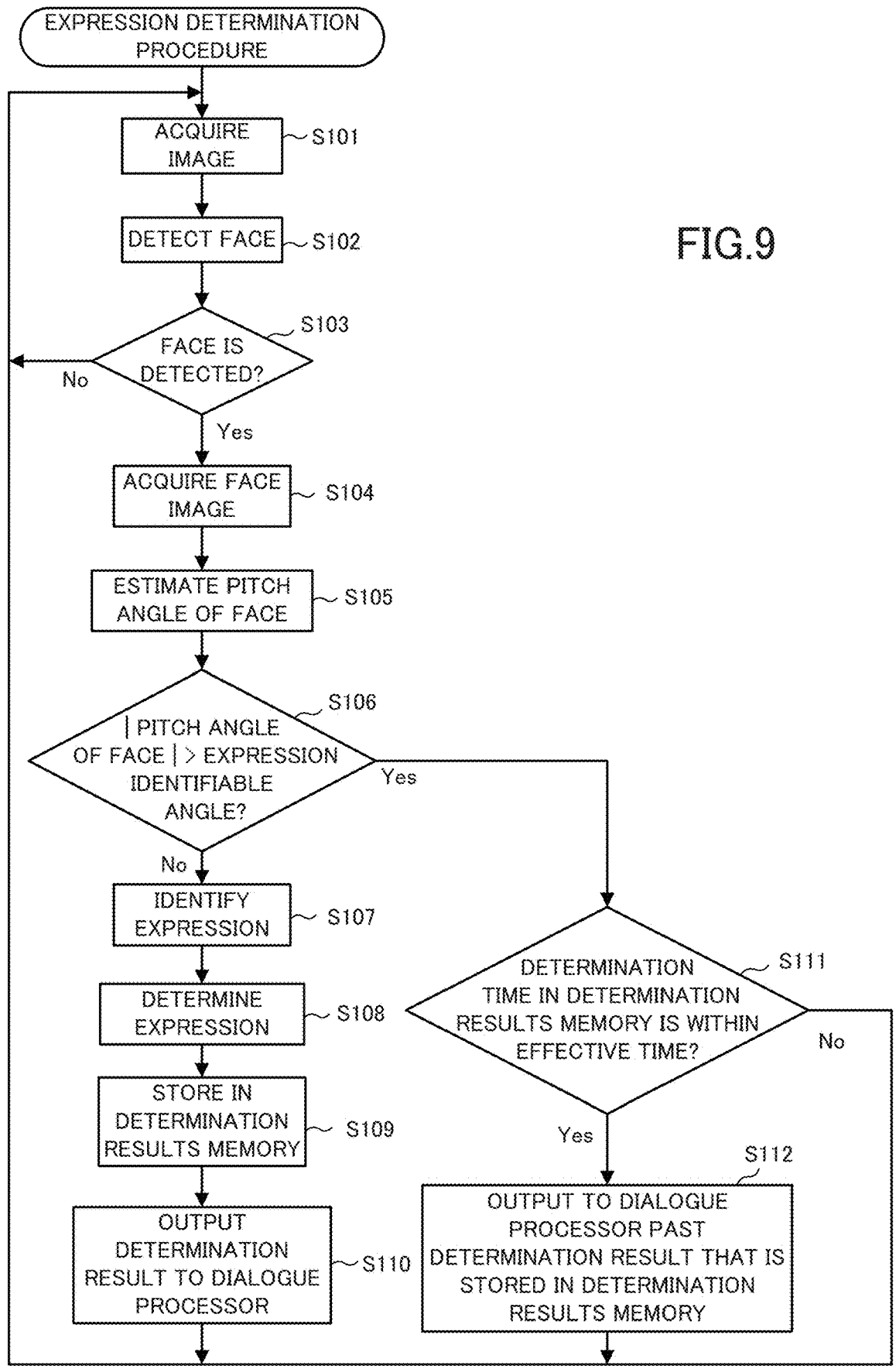
FIG. 9 is a flowchart of the expression determination procedure according to Embodiment 1.
Figure 10:
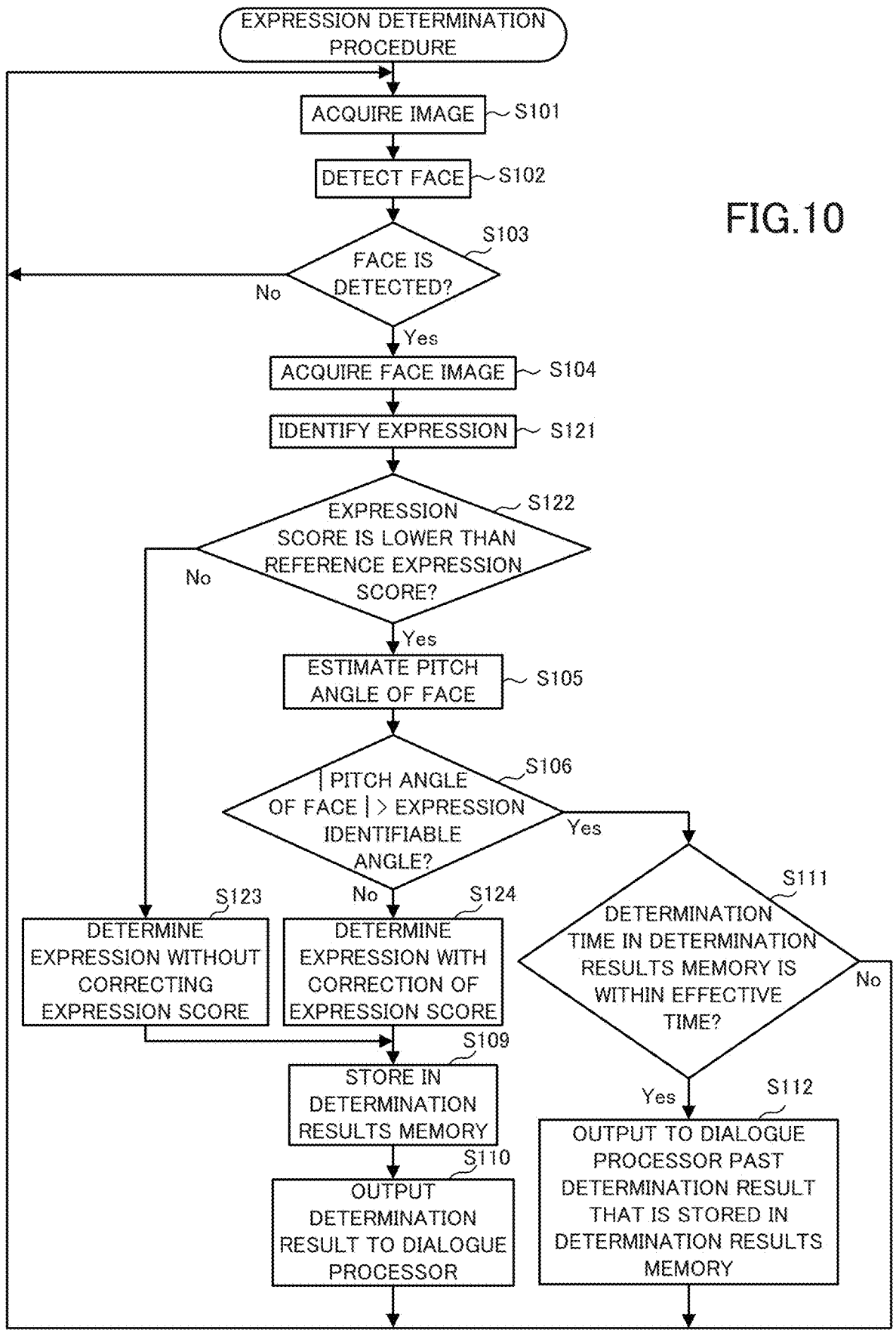
FIG. 10 is a flowchart of the expression determination procedure according to Variation 2.

Variation 2 is different from Embodiment 1 only in the order of some processing of the expression determination procedure that is described with reference to FIG. 9. Therefore, the difference will mainly be described with reference to FIG. 10. The Steps S101 through S104 are the same as in the expression determination procedure of the robot 1 according to Embodiment 1 (FIG. 9). Following the Step S104, the expression identifier 113 acquires an expression score (a smile score) (identifies the expression) of the face that is detected by the face detector 111 (Step S121).

Then, the processor 100 determines whether the expression score (the smile score) that is acquired by the expression identifier 113 is lower than a reference expression score (for example, 1) (Step S122). If equal to or higher than the reference expression score (Step S122; No), the expression determiner 114 determines the expression using the expression score (the smile score) that is acquired by the expression identifier 113 as it is with no correction as the expression determination value (Step S123) and proceeds to the Step S109. If the expression score (the smile score) that is acquired by the expression identifier 113 is lower than the reference expression score (Step S122; Yes), the processing proceeds to the Step S105.

The processing of the Step S105 and the Step S106 is the same as in Embodiment 1. If determined No in the Step S106, the processing proceeds to Step S124. Then, in the Step S124, as in the Step S108, the expression determiner 114 calculates an expression determination value (determines the expression) by applying the pitch angle that is estimated by the face angle estimator 112 and the expression score (the smile score) that is acquired by the expression identifier 113 to the above expression (1). The subsequent processing is the same as in Embodiment 1.

In Variation 2, there is no need of the face angle estimator 112 estimating the pitch angle of the face and the expression determiner 114 performing the calculation of the expression (1) when the expression score (the smile score) is equal to or higher than the reference expression score, whereby the amount of processing of the processor 100 can be reduced.

Embodiment 2

In Embodiment 1, the robot 1 can obtain, by the smile identifier 116 that is provided to the expression identifier 113, a smile score that is a value that indicates the degree of smile among expressions of a human face. The robot 1 can carry out very smooth communication with a dialogue partner simply by being able to know the smile score of the dialogue partner. However, if expressions other than smiles are determined, the quality of communication can further be improved. Then, Embodiment 2 in which the expression identifier 113 of the robot 1 also includes a negative expression identifier 117 will be described.

Figure 11:
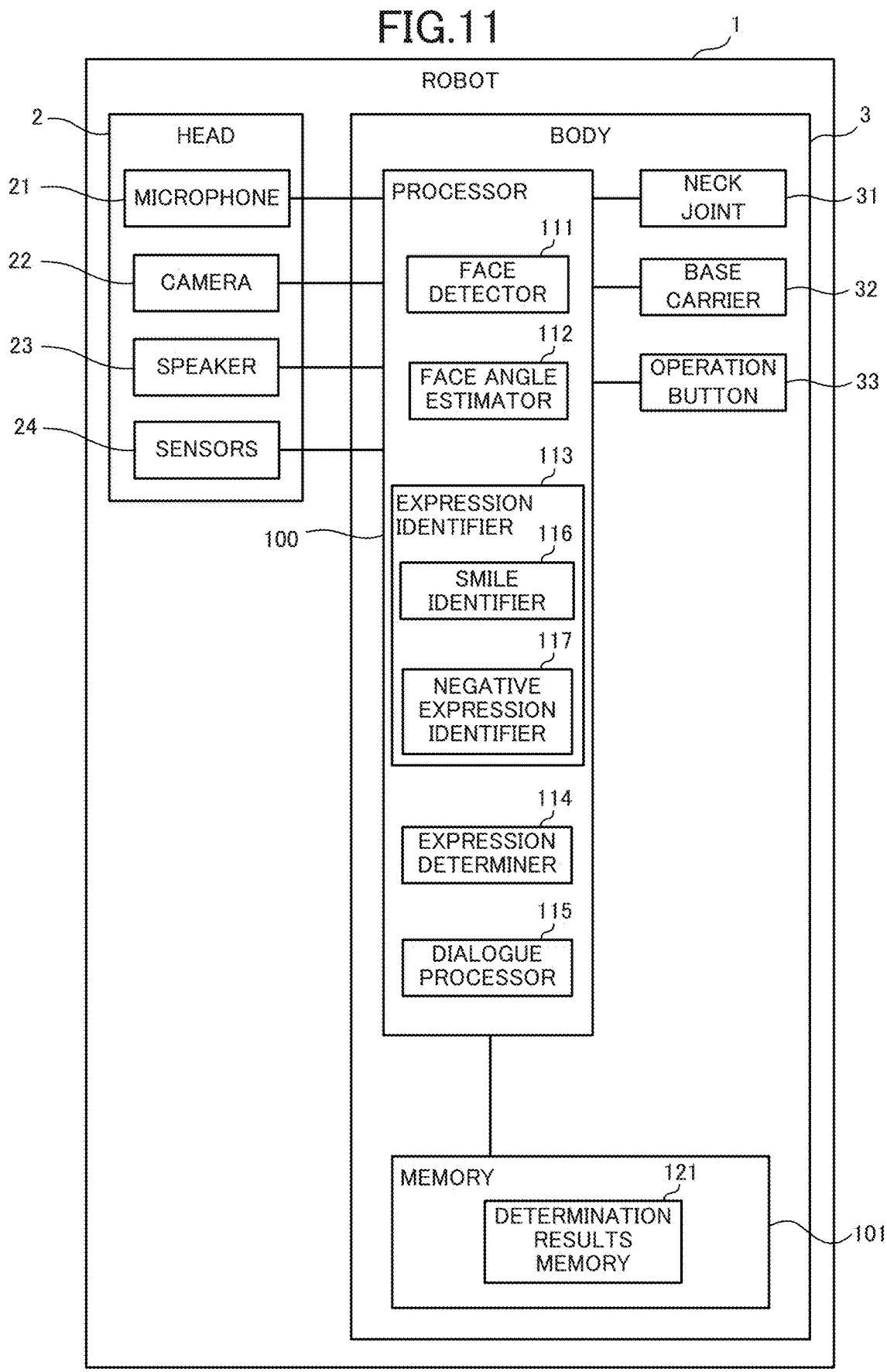
FIG. 11 is a diagram that shows the functional configuration of a robot as an expression determination device according to Embodiment 2 of the present disclosure.

According to the functional configuration of the robot 1 according to Embodiment 2, as shown in FIG. 11, the expression identifier 113 also includes the negative expression identifier 117 in the functional configuration of the robot 1 according to Embodiment 1. The negative expression identifier 117 is an identifier that is similar to the smile identifier 116 but different in learning data that are used in machine learning. The negative expression identifier 117 is an identifier that is generated through machine learning with input of feature quantities of face image data, among which face image data of a front view face with an negative expression (a face wearing fear, a face wearing hate, a face wearing anger, a face wearing contempt, and the like) are a positive example and face image data of a front view face with an expression other than the negative expressions are a negative example. Then, the negative expression identifier 117 acquires a negative score that indicates what degree of negative expressions the facial expression wears (a higher value as the degree of negative expressions is higher) based on the feature quantities of entered face image data.

Moreover, the expression determiner 114 of the robot 1 according to Embodiment 2 determines the expression using an expression determination value that is a value that is calculated based on the value of the smile score that is acquired by the smile identifier 116, the value of the negative score that is acquired by the negative expression identifier 117, and the angle that is estimated by the face angle estimator 112. The expression determination value is a higher positive value as the degree of smile is higher and is a negative value of which the absolute value is higher as the degree of negative expressions is higher. Unlike the smile identifier 116, experiments showed that the value (the negative score) that is acquired by the negative expression identifier 117 increases when the face is an upturned face (when the pitch angle is negative) and there is no apparent tendency when the face is a downturned face (when the pitch angle is positive). Then, it is understood that a value obtained by multiplying the pitch angle by a positive coefficient has only to be added to the negative score that is acquired by the negative expression identifier 117 in order to obtain a relatively stable expression determination value regardless of the face being an upturned/downturned face.

Then, the expression determiner 114 of the robot 1 according to Embodiment 2 calculates the expression determination value (GE) based on the expression (2) below. Here, −0.025 is used as the smile correction coefficient (coefs) and +0.025 is used as the negative expression correction coefficient (coefn). In the expression (2), S+coefs×Pitch is the corrected smile score and N+coefn×Pitch is the corrected negative score. Then, the corrected negative score is multiplied by −1 and added to the corrected smile score to obtain the expression determination value (GE).

$$GE = S + coefs \times Pitch - (N + coefn \times Pitch) \quad (2)$$

where GE is the expression determination value, S is the acquired value of the smile identifier; coefs is the smile correction coefficient, Pitch is the estimated value of the face angle estimator, N is the acquired value of the negative expression identifier, coefn is the negative expression correction coefficient.

Then, the dialogue processor 115 of the robot 1 according to Embodiment 2 performs dialogue with the user based on the expression (the expression determination value) that is determined by the expression determiner 114. For example, the dialogue processor 115 continues the conversation on a topic that is used in the current dialogue when the value of the expression determination value that is output by the expression determiner 114 is positive, and utters words of apology to the user and then tries to change the topic when the value of the expression determination value is negative.

Figure 12:
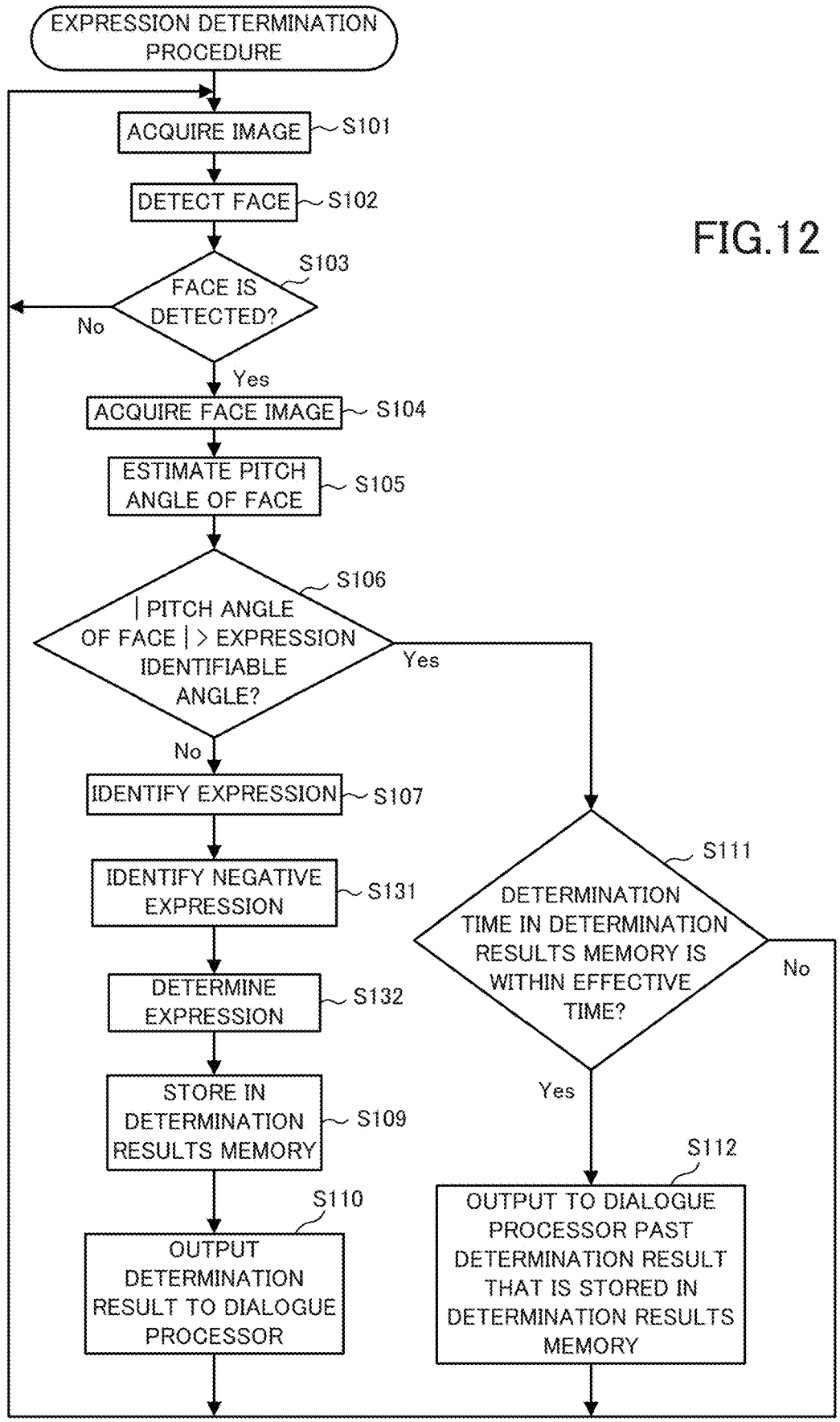
FIG. 12 is a flowchart of the expression determination procedure according to Embodiment 2.

The expression determination procedure of the robot 1 according to Embodiment 2 will be described next with reference to FIG. 12. This procedure has many common parts to the expression determination procedure of the robot 1 according to Embodiment 1 (FIG. 9); therefore, the difference will mainly be described.

The Steps S101 through S107 are the same as in the expression determination procedure of the robot 1 according to Embodiment 1 (FIG. 9). Following the Step S107, the negative expression identifier 117 acquires a negative score of the expression (identifies the negative expression) of the face that is detected by the face detector 111 (Step S131). Then, the expression determiner 114 calculates an expression determination value (determines the expression) by applying the pitch angle that is estimated by the face angle estimator 112, the smile score that is acquired by the smile identifier 116, and the negative score that is acquired by the negative expression identifier 117 to the above expression (2) (Step S132).

The subsequent processing is the same as in the expression determination procedure of the robot 1 according to Embodiment 1. With the above-described expression determination procedure, the robot 1 according to Embodiment 2 can determine the facial expression including not only smiles but also negative expressions without much influence of the orientation of the face even if the person is looking down or up.

In the above-described Embodiment 2, the corrected smile score that is obtained by correcting the smile score with the pitch angle and the smile correction coefficient is a positive value, the corrected negative score that is obtained by correcting the negative score with the pitch angle and the negative expression correction coefficient is multiplied by −1 to be a negative value, and the two are added to define the expression determination value as a scalar value. However, this is not restrictive. For example, the expression determination value may be defined as a two-dimensional vector that has each of the corrected smile score and the corrected negative score. When multiple expressions are presented by a single scalar value, it is highly possible that some of the information of expressions is lost. Therefore, in the case of identifying multiple expressions, it is desirable to define an overall expression determination value by a vector of which the number of dimensions is equal to the number of kinds of expressions and the elements are corrected expression scores that correspond to the expressions. However, calculation is simpler for a scalar than for a vector. Therefore, a scalar may be used where increase in the amount of calculation is not desired.

Moreover, in the above-described Embodiment 2, the degree of negative expressions (fear, hate, anger, and contempt) that are intrinsically multiple expressions is presented by a single scalar value that is termed the negative score. These expressions may separately be identified. In such a case, instead of the negative expression identifier 117, a fear expression identifier, a hate expression identifier, an anger expression identifier, and a contempt expression identifier are prepared and the expression identifiers are subject to machine learning with face image data of the expressions as positive examples and face image data of other expressions as negative examples. Then, the expression determination value is presented by a vector in combination with the acquired values of the other expression identifiers (for example, the smile identifier 116).

Also in such a case, it is possible to obtain influence of the angle of the face on the acquired value of each expression identifier through experiments or the like, define a correction expression to suppress the influence of the angle of the face for each expression identifier, and calculate a corrected expression score that is a corrected value of each expression score. Then, the expression determiner 114 can define an overall expression determination value by a five-dimensional vector of (a corrected smile score, a corrected fear score, a corrected hate score, a corrected anger score, and a corrected contempt score) from the calculated, corrected expression scores. The expression determiner 114 determines the expression based on the value of this vector (for example, adopts the expression that corresponds to the highest corrected expression score), and may give information of the determined expression to the dialogue processor 115 or may give the vector itself to the dialogue processor 115.

Moreover, in order to further increase expressions to determine, the robot 1 may include multiple expression identifiers that correspond to the expressions and acquire a joy score that indicates the degree of joyful face, a surprise score that indicates the degree of surprising face, a sadness score that indicates the degree of a sad face, a crying face score that indicates the degree of a crying face, an ordinary score that indicates the degree of an ordinary face, and the like. For example, when the robot 1 includes, as expression identifiers, a joy identifier, a surprise identifier, a fear identifier, a hate identifier, an anger identifier, a sadness identifier, and an ordinary identifier, an overall expression determination value can be defined by a seven-dimensional vector of (a corrected joy score, a corrected surprise score, a corrected fear score, a corrected hate score, a corrected anger score, and a corrected sadness score, and a corrected ordinary score) of which the elements are the values that are obtained by correcting the acquired values of the expression identifiers based on the angle of the face. In this way, the robot 1 can increase the number of kinds of expressions to determine.

Variation 3

Moreover, in the above-described embodiments, the expression determiner 114 corrects the acquired values of the expression identifiers using mainly the pitch angle as the angle of the face. However, this is not restrictive. For example, for expressions that are largely influenced by the yaw angle of the face, it may be possible that the face angle estimator 112 estimates the yaw angle of the face and the expression determiner 114 corrects the acquired values of the expression identifiers using the yaw angle. Moreover, the angle that is used for the correction does not need to be one angle. It may be possible that the face angle estimator 112 estimates two or three of the pitch angle, the roll angle, and the yaw angle of the face and the expression determiner 114 corrects the acquired values of the expression identifiers on the basis of expression identifier using these angles. In this way, the robot 1 can further improve the accuracy of expression determination.

For example, a left-eye winking identifier that identifies an expression of "winking with the left eye closed" (termed "the left-eye winking" hereafter) is assumed. It is important for identifying the left-eye winking to identify the left eye being closed. However, as the subject turns the face left, the left eye moves to the edge of the face and finally hides in the image that is acquired by the camera 22. Therefore, as the subject turns the face left, even before the left eye hides, the value that is acquired by the left-eye winking identifier (termed "the left-eye winking score" hereafter) presumably decreases. Conversely, as the subject turns the face right, presumably, the left-eye winking score increases until the left eye reaches the center of the face and then the left-eye winking score decreases as the face is further turned right.

Therefore, given that the yaw angle is 0 when the face is a front view face with respect to the optical axis direction and is positive as the face is turned left, when the yaw angle is positive, it is suggested to add a value that is proportional to the yaw angle to the left-eye winking score (the left-eye winking score is corrected to a higher value) in identifying the left-eye winking. Moreover, given that the angle difference between the direction of the left eye and the front view face direction is a reference left eye angle (for example, −15 degrees), it is suggested to add a value that is proportional to the yaw angle (a negative value) to the left-eye winking score (a negative value is added, whereby the left-eye winking score is corrected to a lower value) when the yaw angle is negative and equal to or larger than the reference left eye angle, and to subtract a value that is proportional to (the yaw angle—the reference left eye angle) (a negative value) from the left-eye winking score (a negative value is subtracted, whereby the left-eye winking score is corrected to a higher value) when the yaw angle is smaller than the reference left eye angle. The expression determiner 114 may correct the acquired value of the left-eye winking identifier as described above.

Variation 4

Moreover, in the above-described embodiments, the face detector 111 acquires normalized face image data including the entire face as described with reference to FIG. 4. However, the method of creating the normalized face image data is not restricted thereto. Among the face parts, a region around the eyes (termed "the eye region" hereafter) and a region around the mouth (termed "the mouth region" hereafter) largely affect the expression. Therefore, the face detector 111 may generate image data to enter in the expression identifier 113 by using image data that are obtained by normalizing each of image data of the eye region and image data of the mouth region that are extracted from the face image. For example, image data shown in FIG. 13A are image data that are normalized so as to include both of image data of the eye region and image data of the mouth region.

Moreover, image data of the mouth region are important for identifying smiles. However, when a person speaks, the shape of the mouth changes in accordance with the content of speech. Therefore, change in the shape of the mouth due to speaking may adversely affect the identification of expressions. Then, image data that are normalized so as not to include image data of the mouth region as shown in FIG. 13B may be used for the identification of expressions.

Figure 13A:
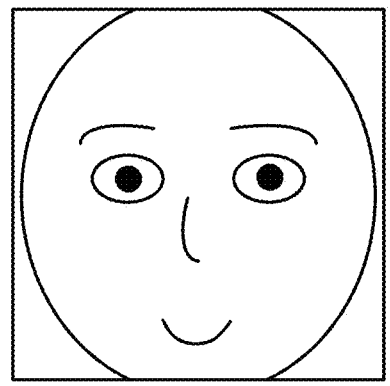
FIG. 13A is an illustration that shows exemplary normalized face image data that includes the mouth region.
Figure 13B:
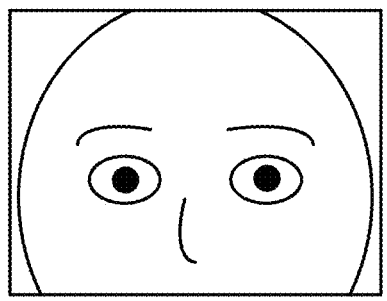
FIG. 13B is an illustration that shows exemplary normalized face image data that does not include the mouth region.

Specifically, the robot 1 according to Variation 4 includes, in regard to the expression identifiers, a mouth-inclusive expression identifier that was subjected to machine learning with image data including the mouth region as shown in FIG. 13A and a mouth-exclusive expression identifier that was subjected to machine learning with image data excluding the mouth region as shown in FIG. 13B. Then, the robot 1 according to Variation 4 determines whether the person is speaking from voice data that is acquired by the microphones 21 in the identification of expressions. Then, the mouth-inclusive expression identifier is used for the identification of expressions if not speaking, and the mouth-exclusive expression identifier is used for the identification of expressions if speaking. In this way, the robot 1 according to the Variation 4 can determine the expressions with high accuracy regardless of the person speaking or not speaking.

Figure 13C:
FIG. 13C is an illustration that shows exemplary normalized face image data that includes only the eye region.

Moreover, for some expressions, the shape of a specific part of the face is important in some cases regardless of speaking/not speaking. For example, presumably, image data of the eye region are important for the above-described identification of "the left-eye winking" and image data of other parts may be noise. Therefore, the left-eye winking identifier that identifies the left-eye winking may be subject to machine learning with image data that include only the eye region as shown in FIG. 13C and the face detector 111 may generate face image data that are obtained by normalizing image data that include only the eye region in the identification of expressions.

Similarly, it may be possible that each expression identifier is subject to machine learning with only a region of the face that is important for an expression that is identified by the expression identifier and only the region is entered to identify the expression. In this way, the robot 1 can improve the accuracy of expression determination.

The functions of the robot 1 as the expression determination device can be implemented by a computer such as a conventional personal computer (PC). Specifically, the above embodiments are described on the assumption that the program for the expression determination procedure that is performed by the robot 1 is prestored in the ROM of the memory 101. However, the program may be saved and distributed on a non-transitory computer-readable recording medium such as a flexible disc, a compact disc read only memory (CD-ROM), a digital versatile disc (DVD), a magneto-optical disc (MO), and a universal serial bus (USB) memory and the program may be read into and installed on a computer to configure a computer that can realize the above-described functions.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

What is claimed is:

1. An expression determination device comprising a processor:
 wherein the processor is configured to:
 acquire image data;
 detect a face of a person from the acquired image data;
 estimate an angle of the detected face;
 acquire a single expression score indicating a degree of expression of an expression worn by the face; and
 determine the expression worn by the face by calculating a single corrected score that is obtained by correcting the acquired single expression score based on the estimated angle of the face.

2. The expression determination device according to claim 1, further comprising:
an imager configured to capture an image,
wherein the processor is configured to acquire image data of the image captured by the imager, and
wherein the angle of the face estimated by the processor is an angle with respect to an optical axis direction of the imager.

3. The expression determination device according to claim 1, wherein the angle of the face that is estimated by the processor is at least one of a pitch angle, a roll angle, or a yaw angle.

4. The expression determination device according to claim 1, wherein the processor is configured to perform the determination of the expression worn by the face when an absolute value of the estimated angle of the face is equal to or less than an expression identifiable angle.

5. The expression determination device according to claim 1, wherein the processor is configured to acquire, after the processor detects the face, the image data during an image-acquisition reference time that is a time necessary for determining the expression.

6. The expression determination device according to claim 1, wherein the processor is configured to acquire, after the processor detects the face, the image data of an image-acquisition reference number of frames that is a number of frames necessary for determining the expression.

7. The expression determination device according to claim 1, wherein the processor is configured to detect a face part from the image data of the face detected by the processor and estimate the angle of the detected face by applying the detected face part to a three-dimensional shape model of a standard front view face.

8. The expression determination device according to claim 1, wherein the processor is configured to:
generate image data that is normalized so as to include eyes and a mouth in the detected face, and
determine the expression of the face that is included in the normalized image data generated.

9. The expression determination device according to claim 1, wherein the processor is configured to:
selectively perform, based on the single expression score, a first determination to determine the expression of the face without correcting the single expression score based on the estimated angle of the face and a second determination to determine the expression of the face by calculating the single corrected score obtained by correcting the single expression score based on the angle of the face.

10. The expression determination device according to claim 1, wherein the processor is configured to:
estimate a pitch angle that is an angle of the face in a vertical direction;
acquire, as the single expression score, a single smile score that is a numeric value that indicates a degree of smile of the expression worn by the face; and
determine the expression of the face by calculating, as the corrected score, a corrected smile score that is obtained by increasing the acquired single smile score in accordance with the pitch angle when the estimated pitch angle is an upward angle.

11. The expression determination device according to claim 1, wherein the processor is configured to:
acquire, as the expression score, a single smile score that is a numeric value that indicates a degree of smile of the expression worn by the face, and further acquire a single negative score that is a numeric value that indicates a degree of negativity of the expression of worn by the face;
estimate a pitch angle that is an angle of the face in a vertical direction;
when the estimated pitch angle is an upward angle, calculate, as the corrected score, a corrected smile score that is obtained by increasing the acquired smile score in accordance with the pitch angle; and
calculate a corrected negative score that is obtained by decreasing the acquired negative score in accordance with the pitch angle, and determine the expression of the face based on the calculated corrected smile score and the corrected negative score.

12. The expression determination device according to claim 1, wherein the processor is configured to:
acquire a single joy score as the expression score of the expression of the detected face, and further acquire a single surprise score, a single fear score, a single hate score, a single anger score, a single sadness score, and a single ordinary score on the expression of the detected face; and
determine the expression of the face in joy, surprise, fear, hate, anger, sadness, and ordinary based on a corrected joy score, a corrected surprise score, a corrected fear score, a corrected hate score, a corrected anger score, a corrected sadness score, and a corrected ordinary score that are obtained by correcting the acquired joy score, surprise score, fear score, hate score, anger score, sadness score, and ordinary score, respectively, based on the angle of the face.

13. The expression determination device according to claim 1, further comprising a memory;
wherein the processor is configured to:
write in the memory a result of the determination along with a determination time when an absolute value of the estimated angle of the face is equal to or less than an expression identifiable angle, and
designate, as a determination result of the expression of the face, a determination result having the determination time within effective time among determination results stored in the memory when the absolute value of the estimated angle of the face exceeds the expression identifiable angle.

14. The expression determination device according to claim 13, wherein the processor is configured to designate, as a determination result of the expression of the face, a latest determination result among determination results stored in the memory when the absolute value of the estimated angle of the face exceeds the expression identifiable angle.

15. An expression determination method, comprising:
acquiring image data;
detecting a face of a person from the acquired image data;
estimating an angle of the detected face; and
acquiring a single expression score indicating a degree of expression of an expression worn by the face, and determining the expression worn by the face by calculating a single corrected score that is obtained by correcting the acquired single expression score based on the estimated angle of the face.

16. A non-transitory computer-readable recording medium storing a program, the program causing a computer to:
acquire image data;
detect a face of a person from the acquired image data;
estimate an angle of the detected face; and acquire a single expression score indicating a degree of expression of an expression worn by the face, and determine the expression worn by the face by calculating a single corrected score obtained by correcting the acquired single expression score based on the estimated angle of the face.

* * * * *

UNITED STATES PATENT AND TRADEMARK OFFICE
CERTIFICATE OF CORRECTION

PATENT NO. : 10,713,477 B2
APPLICATION NO. : 15/989688
DATED : July 14, 2020
INVENTOR(S) : Kouichi Nakagome and Keisuke Shimada Page 1 of 1

It is certified that error appears in the above-identified patent and that said Letters Patent is hereby corrected as shown below:

In the Claims

Column 16, Line 2, after "expression" delete "of".

Signed and Sealed this
Twentieth Day of October, 2020

Andrei Iancu
*Director of the United States Patent and Trademark Office*